(12) United States Patent
Harvey et al.

(10) Patent No.: US 11,733,339 B2
(45) Date of Patent: Aug. 22, 2023

(54) EMERGENCY RADIO BEACON REMOTE ACTIVATION SYSTEM

(71) Applicants: Doriette Fransien Harvey, Connolly (AU); Frederick Harvey, Connolly (AU)

(72) Inventors: Doriette Fransien Harvey, Connolly (AU); Frederick Harvey, Connolly (AU)

( * ) Notice: Subject to any disclaimer, the term of this patent is extended or adjusted under 35 U.S.C. 154(b) by 315 days.

(21) Appl. No.: 16/756,841

(22) PCT Filed: Oct. 15, 2018

(86) PCT No.: PCT/AU2018/051119
§ 371 (c)(1),
(2) Date: Apr. 16, 2020

(87) PCT Pub. No.: WO2019/075512
PCT Pub. Date: Apr. 25, 2019

(65) Prior Publication Data
US 2021/0033692 A1 Feb. 4, 2021

(30) Foreign Application Priority Data
Oct. 16, 2017 (AU) .................... 2017904169

(51) Int. Cl.
*G01S 1/68* (2006.01)
*G01S 1/04* (2006.01)
(Continued)

(52) U.S. Cl.
CPC ............... *G01S 1/68* (2013.01); *G01S 1/042* (2013.01); *G01S 19/17* (2013.01); *G08B 25/016* (2013.01); *G08B 25/08* (2013.01); *H04W 4/021* (2013.01)

(58) Field of Classification Search
CPC ......... H04W 4/008; H04W 4/04; H04W 4/14; H04W 4/021; H04W 4/90; G01S 1/042;
(Continued)

(56) References Cited

U.S. PATENT DOCUMENTS 5,523,982 A * 6/1996 Dale ...................... H04B 11/00
367/134
5,563,612 A * 10/1996 Flood .................... G01S 5/0231
342/385

(Continued)

FOREIGN PATENT DOCUMENTS

GB 2430064 A 3/2007
WO WO-2003/089953 A1 10/2003

OTHER PUBLICATIONS

"International Search Report"; prepared for application No. PCT/AU2018/051119; authorized officer Riju Jacob; dated Dec. 10, 2018; 6 pages.

*Primary Examiner* — Jean A Gelin
(74) *Attorney, Agent, or Firm* — Winstead PC

(57) ABSTRACT

Provided is a system (10) for remote activation of an emergency radio beacon by a Search and Rescue (SAR) party, the system (10) comprising a controller (12) operatively arranged in signal communication with an emergency radio beacon (14), a positioning module (16) arranged in signal communication with the controller (12) and configured to operatively provide spatial positioning data to the controller (12), and a receiver (18) arranged in signal communication with the controller (12) and configured to operatively receive an activation signal (20). The controller (12) is configured to activate the beacon (14) upon receipt of the activation signal (20) and to provide the spatial positioning data of a potentially lost or distressed party to the beacon (14) for transmission along with an emergency signal (22).

14 Claims, 2 Drawing Sheets

(51) Int. Cl.
*G01S 19/17* (2010.01)
*G08B 25/01* (2006.01)
*G08B 25/08* (2006.01)
*H04W 4/021* (2018.01)

(58) Field of Classification Search
CPC .......... G01S 1/68; G01S 19/17; G01S 5/0231; G01S 5/0273; G01S 19/02; G01S 19/252; G08B 26/016; G08B 25/08
See application file for complete search history.

(56) References Cited

U.S. PATENT DOCUMENTS

| | | | | |
|---|---|---|---|---|
| 8,164,431 | B2* | 4/2012 | Morgan | G01S 5/0027 340/5.72 |
| 8,514,095 | B2 | 8/2013 | Greer et al. | |
| 10,229,581 | B1* | 3/2019 | Bender | H04W 4/022 |
| 2009/0167536 | A1* | 7/2009 | Clark | G08B 21/0233 340/686.1 |
| 2009/0209227 | A1* | 8/2009 | Greer | G08B 25/016 455/404.2 |
| 2010/0271198 | A1* | 10/2010 | Boling | G08B 25/08 340/539.1 |
| 2011/0103558 | A1* | 5/2011 | Hooten | A62B 35/04 379/37 |
| 2011/0307124 | A1* | 12/2011 | Morgan | B60R 25/04 701/2 |
| 2012/0075097 | A1* | 3/2012 | Jacobson | H04L 63/102 340/539.13 |
| 2012/0299776 | A1* | 11/2012 | Lee | B63C 9/00 342/386 |
| 2013/0076523 | A1* | 3/2013 | Kwan | A61B 5/1117 340/8.1 |
| 2014/0002306 | A1* | 1/2014 | Nguyen | G01S 3/143 342/442 |
| 2015/0133189 | A1* | 5/2015 | Mukae | H04B 7/1851 455/556.1 |
| 2015/0373482 | A1* | 12/2015 | Barnard | H05B 47/11 370/338 |
| 2016/0044521 | A1* | 2/2016 | Doh | H04W 24/04 370/242 |
| 2016/0054425 | A1* | 2/2016 | Katz | G01S 3/14 342/417 |
| 2016/0198295 | A1* | 7/2016 | Jeon | H04W 4/021 455/456.3 |
| 2017/0131105 | A1* | 5/2017 | Buscemi | G01C 21/206 |
| 2017/0199266 | A1* | 7/2017 | Rice | G01S 5/021 |
| 2017/0238129 | A1 | 8/2017 | Maier et al. | |

* cited by examiner

EMERGENCY RADIO BEACON REMOTE ACTIVATION SYSTEM

TECHNICAL FIELD

This invention relates to a system for remote activation of an emergency radio beacon by a Search and Rescue (SAR) party, and an associated remotely activatable emergency radio beacon.

BACKGROUND ART

The following discussion of the background art is intended to facilitate an understanding of the present invention only. The discussion is not an acknowledgement or admission that any of the material referred to is or was part of the common general knowledge as at the priority date of the application.

Emergency radio beacons are known in the art. An Emergency Position Indicating Radio Beacon (EPIRB) is typically used to alert search and rescue services in the event of an emergency. EPIRBs are tracking transmitters which aid in the detection and location of boats, aircraft, and people in distress. EPIRBs generally function by transmitting a coded message on the 406 MHz distress frequency via satellite and earth stations to the nearest rescue co-ordination centre. In most countries, EPIRBs are mandated to be used in all commercial and private shipping.

EPIRBs generally rely on the Cospas-Sarsat polar orbiting satellite system, an international satellite system for search and rescue (SAR), which provides global coverage. The signals are monitored worldwide and the location of the distress is detected by these non-geostationary satellites using the Doppler effect for trilateration.

The coded message transmitted by an EPIRB identifies the exact vessel to which the EPIRB is registered. This information allows rescue services to eliminate false alerts and launch an appropriate rescue. Some EPIRBs also have a secondary distress transmitter which typically transmits on the 121.5 MHz spectrum and is used for "homing" purposes. When the rescue services get close, this allows them to direction find on the signal. Some EPIRBs also have a high brightness LED flashing light that aids final visual location.

A Personal Locator Beacon (PLB) is a particular type of EPIRB that is typically smaller, has a shorter battery life and, unlike an EPIRB, is registered to a person rather than a vessel. PLBs work in exactly the same way as EPIRBs by sending a coded message on the 406 MHz distress frequency which is relayed via the Cospas-Sarsat global satellite system.

EPIRBs and PLBs typically require manual activation, or may be automatically activated upon immersion or impact by having suitable immersion or impact activation sensors. Applicant has identified a shortcoming in the art, as such conventional activation methodologies are not always best suited to search and rescue operations by Search and rescue (SAR) teams.

The present invention seeks to propose possible solutions, at least in part, in amelioration of the known shortcomings in the art.

SUMMARY OF THE INVENTION

According to a first aspect of the invention there is provided a system for remote activation of an emergency radio beacon by a Search and Rescue (SAR) party, said system comprising:

a controller operatively arranged in signal communication with an emergency radio beacon;

a receiver arranged in signal communication with the controller and configured to operatively receive an activation signal from the SAR party; and a positioning module arranged in signal communication with, and configured to operatively provide spatial positioning data to, the controller, wherein the controller is configured to activate the beacon upon receipt of the activation signal and to provide the spatial positioning data to the beacon for transmission as part of an emergency signal.

In one example, the controller is configurable with a predetermined geo-fence, said controller configured to activate the radio beacon should the system move outside the geo-fence, as determined by the positioning module. The skilled addressee will appreciate that a geo-fence is a virtual perimeter for a real-world geographic area.

In one example, the controller includes a transducer configured to monitor a predetermined aspect of a vessel or person to which the radio beacon is registered.

Typically, the predetermined aspect is selected from either a human physiology-related measurement or an operational characteristic of a vessel.

Typically, the radio beacon comprises an EPIRB (emergency position-indicating radio beacon), a PLB (personal locator beacon), an ELT (emergency location transmitter), a SEPIRB (submarine EPIRB), or the like.

Typically, the controller is arranged in communication with the beacon by means of a suitable electromagnetic waveguide.

Typically, the controller is configured to encode the spatial positioning data for transmission as part of the emergency signal.

In one example, the positioning module includes a global navigation satellite system (GNNS) module.

The skilled addressee will appreciate that a global navigation satellite system (GNSS) generally comprises a satellite navigation system with global coverage, e.g. the United States' Global Positioning System (GPS), Russia's GLONASS and the European Union's Galileo, or the like.

Typically, the receiver includes a radio frequency receiver.

In one example, the receiver is configured to receive the activation signal in a frequency allocated for satellite transmission systems.

Typically, the system includes energising means for operatively energising the controller, the positioning module and the receiver.

In one example, the energising means includes at least one electrochemical cell.

In one example, the energising means includes a photovoltaic arrangement for supplying at least one electrochemical cell with energy.

In one example, the controller is configured to provide an indication of a status of the energising means.

Typically, the controller is configured to perform a system diagnostic check on the beacon, controller, receiver, positioning module and/or energising means on receipt of an interrogation signal via the receiver.

In one embodiment, the controller is configured to transmit an outcome of such system diagnostic check.

Typically, the controller is configured with a low-power consumption mode wherein only reception of the activation signal from the SAR party by the receiver is monitored in order to minimise power consumption.

In one example, the system is enclosed in a sealed and impact-resistant housing to prevent the ingress of water and/or dirt.

In one example, the system includes an audible and/or visual indicator that is activated upon receipt of the activation signal.

According to a second aspect of the invention there is provided an emergency radio beacon remotely activatable by a Search and Rescue (SAR) party, said beacon comprising:

a transmitter for operatively transmitting an emergency signal;

a controller operatively arranged in signal communication with the transmitter;

a receiver arranged in signal communication with the controller and configured to operatively receive an activation signal from the SAR party; and a positioning module arranged in signal communication with, and configured to operatively provide spatial positioning data to, the controller, wherein the controller is configured to activate and provide the spatial positioning data to the transmitter upon receipt of the activation signal so that the emergency signal is indicative of a geographic position of the beacon.

In one example, the controller includes a transducer configured to monitor a predetermined aspect of a vessel or person to which the radio beacon is registered.

Typically, the predetermined aspect is selected from either a human physiology-related measurement or an operational characteristic of a vessel.

Typically, the radio beacon comprises an EPIRB (emergency position-indicating radio beacon), a PLB (personal locator beacon), an ELT (emergency location transmitter), a SEPIRB (submarine EPIRB), or the like.

Typically, the controller is arranged in communication with the beacon by means of a suitable electromagnetic waveguide.

Typically, the controller is configured to encode the spatial positioning data for transmission as part of the emergency signal.

In one example, the positioning module includes a global navigation satellite system (GNNS) module.

Typically, the receiver includes a radio frequency receiver.

In one example, the receiver is configured to receive the activation signal in a frequency allocated for satellite transmission systems.

Typically, the controller is configured with a low-power consumption mode wherein only reception of the activation signal from the SAR party by the receiver is monitored in order to minimise power consumption of the system.

Typically, the beacon includes energising means for operatively energising the controller, the positioning module and the receiver.

In one example, the energising means includes at least one electrochemical cell.

In one example, the energising means includes a photovoltaic arrangement for supplying at least one electrochemical cell with energy.

In one example, the controller is configured to provide an indication of a status of the energising means.

Typically, the controller is configured to perform a system diagnostic check on the beacon, controller, receiver, positioning module and/or energising means on receipt of an interrogation signal via the receiver.

In one embodiment, the controller is configured to transmit an outcome of such system diagnostic check.

In one example, the controller is configurable with a user-definable expiry date, said controller configured to disable the energising means when such expiry date is reached.

In one example, the beacon is enclosed in a sealed and impact-resistant housing to prevent the ingress of moisture and/or dirt.

In one example, the beacon includes an audible and/or visual indicator that is activated upon receipt of the activation signal.

In a further example, the activation signal is generated by means of a user input to the controller, a fluid-pressure sensor of the controller, or a fluid sensor of the controller.

According to a further aspect of the invention there is provided a method for retrofitting an emergency radio beacon with a system for remote activation of said beacon by a Search and Rescue (SAR) party, said method comprising the steps of:

providing an emergency radio beacon; and fitting a system for remote activation of an emergency radio beacon in accordance with the first aspect of the invention thereto.

BRIEF DESCRIPTION OF THE DRAWINGS

The description will be made with reference to the accompanying drawings in which.

DETAILED DESCRIPTION OF EMBODIMENTS

Figure 1:
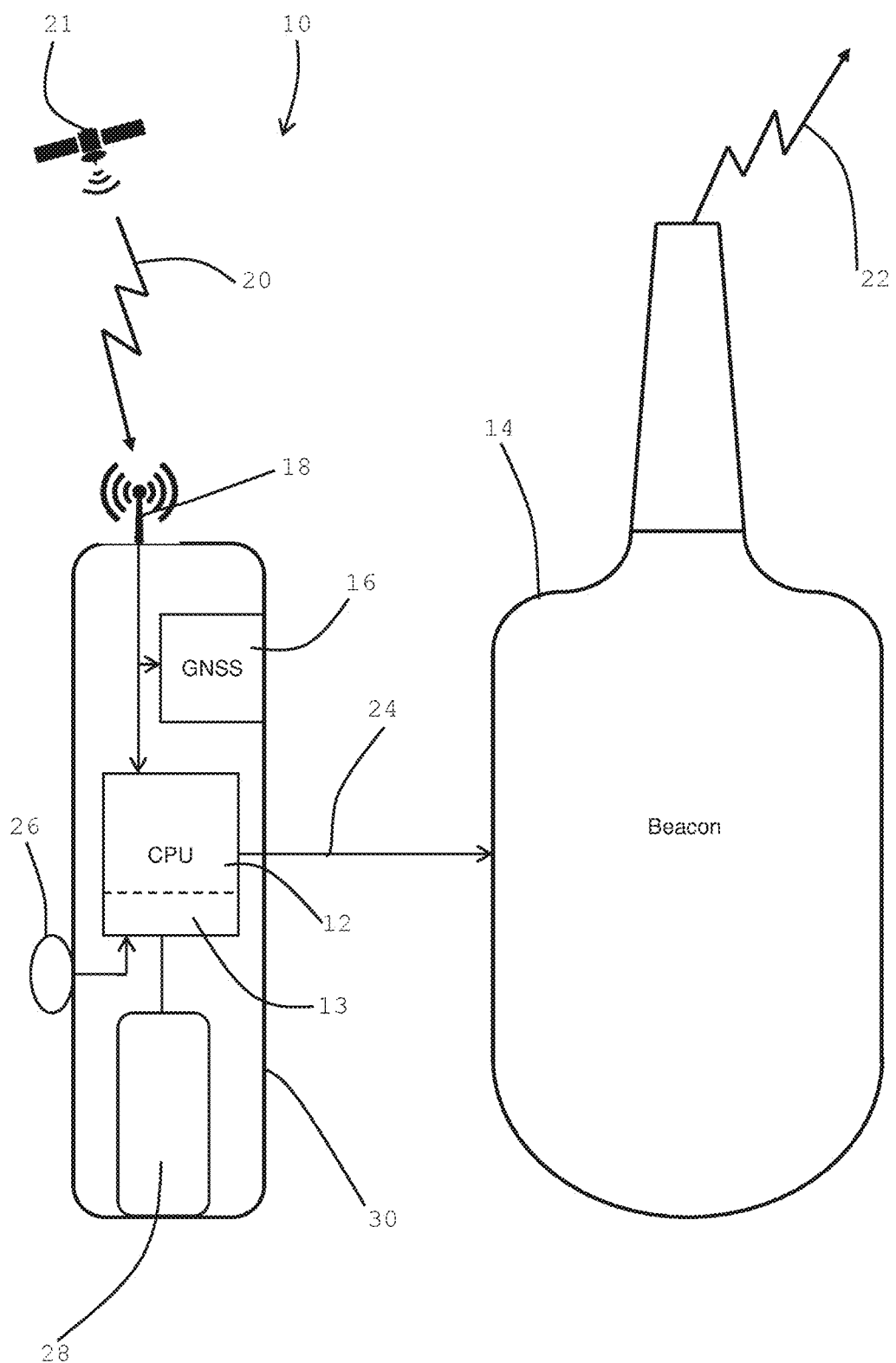
FIG. 1 is a diagrammatic representation of one example of an emergency radio beacon activation system in accordance with an aspect of the invention.

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above. In the figures, incorporated to illustrate features of the example embodiment or embodiments, like reference numerals are used to identify like parts throughout.

With reference now to the accompanying Figures, there is shown one embodiment of an emergency radio beacon activation system 10. System 10 is generally configured for remote activation of an emergency radio beacon 14 by a Search and Rescue (SAR) party in accordance with one aspect of the present invention. In this present example, emergency radio beacon activation system 10 broadly comprises a controller 12, a positioning module 16, and a receiver 18.

Broadly, the system 10 allows for a remote activation signal to be sent from a Search and Rescue team or party (diagrammatically represented by satellite 21) to wake-up an EPIRB or similar beacon of a potentially distressed or lost party and interrogate that EPIRB for position information with the intention of using the position information to rescue the lost party and/or causing the EPIRB to start sending distress signals. As far as known, conventional systems require a beacon to be activated by a user, as the present invention enables remote activation of a beacon.

In general, the controller 12 is operatively arranged in signal communication with an emergency radio beacon 14, as shown. The radio beacon 14 generally comprises an EPIRB (emergency position-indicating radio beacon), a PLB (personal locator beacon), an ELT (emergency location transmitter), a SEPIRB (submarine EPIRB), or the like. The controller 12 includes a microcontroller which is configured to interpret and execute suitable processor instructions, as is known in the art of microcontrollers.

The controller 12 is generally arranged in communication with the beacon 14 by means of a suitable electromagnetic waveguide 24, which may include electrical conductors and/or a suitable electromagnetic transmission channel. Accordingly, the activation system 10 can be located proximate the beacon 14 and arranged in suitable signal communication by means of a physical connection, or the activation system 10 can be located distant from the beacon 14 and arranged in suitable signal communication by means of an electromagnetic transmission channel, e.g. a Wi-Fi channel, a Bluetooth channel, short-wave radio channel, or the like.

Importantly, the system 10 may be retrofitted to an existing emergency beacon, where the retrofitting would permit an existing emergency beacon to be operated in constant standby mode, and remote activated and deactivated from that standby mode. Of course, other embodiments could see the system incorporated as part of a new design of emergency beacon, an example of which is provided below.

The positioning module 16 is arranged in signal communication with the controller 12 and configured to operatively provide spatial positioning data to the controller 12. In one example, the positioning module includes a global navigation satellite system (GNNS) module. The skilled addressee will appreciate that a global navigation satellite system (GNSS) generally comprises a satellite navigation system with global coverage, e.g. the United States' Global Positioning System (GPS), Russia's GLONASS and the European Union's Galileo GNSSs. Other GNSSs may be appropriate.

System 10 also includes receiver 18 which is arranged in signal communication with the controller 12 and is configured to operatively receive an activation signal 20 from a SAR party. The controller 12 is configured to activate the beacon 14 upon receipt of the activation signal 20 and to provide the spatial positioning data to the beacon 14 for transmission along with an emergency signal 22. The controller 12 is typically configured to encode the spatial positioning data for transmission as part of the emergency signal, e.g. to minimise required bandwidth, or the like.

The receiver 18 generally includes a radio frequency receiver. In one example, the receiver 18 may be configured to receive the activation signal 20 in a frequency allocated for satellite transmission systems, or the like.

The skilled addressee will appreciate that the activation signal may include any suitable signal useable to activate an emergency beacon 14 generally over long distances. For example, the activation signal may include a radio signal transmitted via a satellite system in order to activate the beacon 14 over a large geographic area, or a long-distance radio signal, or the like. A variety of activation signals may be suitable and is within the scope of the present invention.

In one example, the controller 12 is configurable with a predetermined geo-fence, wherein the controller 12 is configured to activate the radio beacon 14 should the system 10 move outside this geo-fence, generally as determined by the positioning module 16. The skilled addressee will appreciate that a geo-fence is a virtual perimeter for a real-world geographic area typically making use of GNSS technology.

In one example, the controller 12 includes a transducer 26 which is configured to monitor a predetermined aspect of a vessel or person to which the radio beacon 14 is registered, i.e. as is known in the art, emergency radio beacons are typically registered to a particular entity to allow tracking and tracing of details, etc. Typically, the predetermined aspect is selected from either a human physiology-related measurement or an operational characteristic of a vessel.

For example, the controller 12 can use the transducer 26 to sense a variety of such predetermined aspects, including either a human physiology-related measurement or an operational characteristic of a vessel. The human physiology-related measurement may be any measurement whereby a person in distress can be identified, for example a heart rate, blood pressure, etc. Similarly, the operational characteristic of a vessel may be any characteristic whereby a vessel in distress can be identified, e.g. fuel level, equipment status, hull integrity, etc.

The system 10 typically includes energising means 28 for operatively energising the controller 12, the positioning module 16 and the receiver 18. In one example, the energising means 28 includes at least one electrochemical cell, or a plurality to form a battery. In another example, the energising means 28 may include a photovoltaic arrangement for supplying at least one electrochemical cell with energy, an alternating current (AC) generator, or the like.

The controller 12 may also be configured to perform a system diagnostic check on the beacon 14, controller 12, receiver 18, positioning module 16 and/or energising means 28 on receipt of an interrogation signal via the receiver 18. In one example, the controller 12 may be configured to provide an indication of a status of the energising means 28, such as a battery charge status, operational capability status, etc. Similarly, the controller 12 may be configured to provide a health or related operability indication of the system 10, or constituents parts of said system 10. In one embodiment, the controller 12 is configured to transmit an outcome of such system diagnostic check.

For example, the system 10 can be interrogated by a remote-monitoring centre or SAR party 21 to check on the operation of the system 10 or beacon 14, such as status of energising means 28, status of GNSS module 16, status of receiver 18, or the like. This interrogation can include a check of all of the operation cycles of the system 10, or the like. This has the advantage of providing advanced notice of imminent failure of beacon 14. The controller 12 is also generally configured with a low-power monitoring element 13, which required very little power consumption and wherein only reception of the activation signal 20 from the SAR party 21 by the receiver 18 is monitored in order to minimise power consumption of the overall system 10.

In a further embodiment, in such low-power constant standby mode, the system 10 can be remote controlled to be turned on to deliver location information, then put back into standby mode to conserve power, then later on reactivated to confirm any changes in the location of the beacon, or the like. Such remote monitoring has the effect of increasing the effective period of operation of the system 10 or beacon 14 and taking account of any changes in position of the beacon 14 that may have happened since the previous location check.

In a yet further example, the controller 12 is configurable with a user-definable expiry date, wherein the controller 12 is configured to disable the energising means 28 when such expiry date is reached. For example, it is common in emergency beacons that they have a 'use-by' date after which they are not to be used. For this purpose, the system 10 can be programmed to blow a low power fuse in its power circuits once its use-by date has been exceeded, or the like. This also reduces the risk of false alarms from unregistered out-of-date emergency beacons.

In one example, the system 10 is enclosed in a sealed and impact-resistant housing 30 to prevent the ingress of water and/or dirt. In a further example, the system 10 can be used to remote control other devices in the vicinity of the emergency beacon 14 or system 10, as well as to communicate via e.g. short text messages with the users or operators of the emergency beacon, etc. Such remote control can be achieved by the use of an open collector type output from the system 10 or by a USB port connected by a suitable interface unit provided with its own power, so as to avoid compromising the emergency power of the system 10 or beacon 14.

Figure 2:
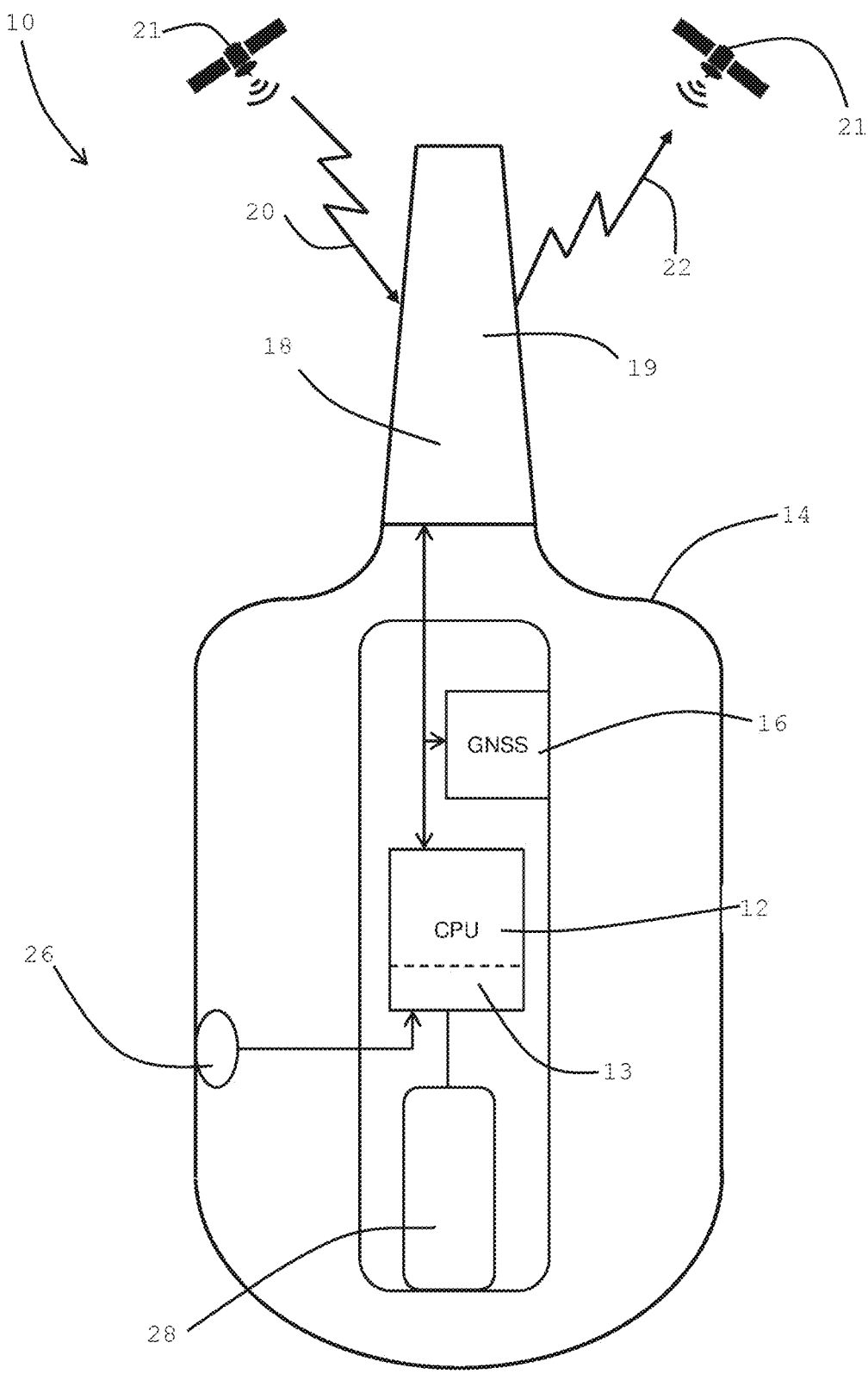
FIG. 2 is a diagrammatic representation of one example of an emergency radio beacon in accordance with an aspect of the invention.

Referring now to FIG. 2 of the accompanying drawings, there is shown an emergency radio beacon 14 in accordance with an aspect of the present invention. The beacon 14 generally incorporates the activation system 10 described above.

Accordingly, the beacon 14 comprises a transmitter 19 for operatively transmitting the emergency signal 22, the controller 12 operatively arranged in signal communication with the transmitter 19, the positioning module 16 arranged in signal communication with the controller 12 and configured to operatively provide spatial positioning data to the controller 12, as well as the receiver 18 arranged in signal communication with the controller 12 and configured to operatively receive the activation signal 20. As above, the controller 12 is configured to activate the transmitter 19 upon receipt of the activation signal 20 and to provide the spatial positioning data to the beacon 14 for inclusion into the emergency signal 22.

Applicant believes it particularly advantageous that the present invention provides means whereby an emergency radio beacon, such as an EPIRB or PLB, can be remotely activated via a suitable activating signal. Such functionality finds particular application in locating missing people or vessels fitted with emergency beacons in circumstances where manual activation of such beacons is not possible, such as due to people being unconscious, etc.

The skilled addressee is to appreciate that variations to the system 10 an/or beacon 14 are possible. For example, the system 10 generally provides a means of remotely activating a standard emergency beacon 14 without user input. Such remote activation typically occurs from a SAR emergency control centre 21, which could be located anywhere in the world. Unlike a conventional emergency beacon, which only gets turned ON when activated by a user or when immersed in water, and as such is not consuming any power from its batteries, the emergency radio beacon activation system 10 is drawing power from the batteries all the time the system 10 is enabled.

As such, it is envisaged that the emergency radio beacon activation system 10 is only turned ON (enabled) while the owner/user is engaged in an activity which may be hazardous or a threat to life. When not required, the emergency radio beacon activation system 10 would be turned OFF (disabled), thus preventing the battery supply being discharged and unable to provide power during an emergency.

In general, the emergency radio beacon activation system 10 (and associated emergency beacon 14) would be fully charged prior to starting a journey or similar potentially perilous activity. In this mode or when being stored (not in use) the emergency radio beacon activation system 10 would be OFF (disabled). At the commencement of the journey or activity, the emergency radio beacon activation system 10 is turned ON (enabled). In this low power standby mode, the emergency radio beacon activation system 10 is ON and only powering the receiver electronics 18 and low-power controller element 13 which is of a very low power design. The rest of the controller electronics 12, the GNSS 16 and sensor 26 and including the emergency beacon 14 are disabled (OFF).

As described, the controller 12, the GNSS 16 and the sensor 26 can be powered-up via the controller element 13 at regular intervals to check the status of those inputs, for example, to determine if the geofencing has been breached or any of the external sensor conditions have exceeded their pre-set levels, thus requiring transmission of the emergency signal 22. This usage consumes a minimum amount of electrical power and could be provided by a solar power supply.

When the system 10 is to be remote activated, a remote activation signal 20 from the emergency operations centre 21 is sent, causing the emergency radio beacon activation system 10 to power up the remaining control electronics. Once all the data transfer has been verified, the emergency radio beacon activation system 10 powers up the emergency beacon 14. Once the beacon 14 starts transmitting there is a significant increase in power consumption. However, once the beacon 14 transmits its position location information to the control centre and that information is verified the activation system 10 can power the beacon 14 OFF and return to its standby mode of operation.

A further advantage includes potential false alarms, which are one of the single biggest issues with emergency beacons, accounting for the vast majority of all emergency signals generated (reportedly 98% of alarms are false alarms). The system 10 and beacon 14 can also include an alarm authentication feature whereby the beacon is interrogated for position information from a registration rescue service who can then communicate with one or more emergency contact people (via telephone) and/or travel plans registered to the beacon which issued the emergency signal. The use of registered travel plans could be used to automate the authentication of emergency signals generated from a registered beacon. In this way, false alarms can be reduced or even eliminated.

Similarly, since about 25% of all emergency beacons are not registered, there is usually a significant risk of false alarms being generated and no easy way to identify the owners of those beacons. Hence, the system 10 can also be programmed for receiving a deactivation signal for rendering the system inoperative where it generates repeated false alarms. The beacon is, however, able to be reactivated by re-registering it with a monitoring agency.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

It is to be appreciated that reference to "one example" or "an example" of the invention, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the invention, whilst other aspects are exemplified in a different example. These examples are not intended to limit the overall scope of the invention in any way unless the context clearly indicates otherwise. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

The invention claimed is:

1. An emergency radio beacon for operation with a satellite network monitored by a monitoring party, the emergency radio beacon being capable of two way communication with the monitoring party via the satellite network, the emergency radio beacon being operable in each of a storage mode, a constant standby mode, a remote interrogation mode and an emergency mode, the emergency radio beacon comprising:
   a control means operable by a user of the emergency radio beacon for changing the mode of operation of the emergency radio beacon between the storage mode, the constant standby mode and the emergency mode, the control means also being operable by the monitoring party between the constant standby mode, the remote interrogation mode, and the emergency mode;
   a receiver in operative association with the control means for receiving interrogation signals from the monitoring party via the satellite network when the emergency radio beacon is operated in the constant standby mode, the receiver delivering the interrogation signals to the control means for causing the control means to change operation from the constant standby mode to the remote interrogation mode for assessing the state of distress of the user, the receiver also receiving emergency initiation signals from the monitoring party and delivering the emergency initiation signals to the control means for causing change of operation from the constant standby mode to the emergency mode without assessing the state of distress of the user;
   a transmitter in operative association with the control means, the transmitter being controlled by the control means for preventing the transmitter from transmitting signals during the constant standby mode of operation, the transmitter also being controlled by the control means for replying to the interrogation signals from the monitoring party during the remote interrogation mode, and the transmitter also being controlled by the control means for transmitting emergency signals to the monitoring party during the emergency mode of operation; and
   a positioning module arranged in signal communication with, and configured to operatively provide spatial positioning data to, the control means for inclusion in signals replying to the interrogation signals and as part of the emergency signals;
   wherein the control means is configured to provide the said spatial positioning data to the emergency radio beacon for transmission as part of a response to the interrogation signals and as part of the emergency signals; and
   wherein the control means is configured to be interrogated by the monitoring party to determine the status of the user and initiate transmission of emergency signals by changing the mode of operation from the constant standby mode to the emergency mode.

2. The emergency radio beacon of claim 1, wherein the control means is configurable with a predetermined geo-fence, said control means being configured to activate the radio beacon should the radio beacon move outside the geo-fence, as determined by the positioning module.

3. The emergency radio beacon of claim 1, wherein the control means includes a transducer configured to monitor a predetermined aspect of a vessel or person.

4. The emergency radio beacon of claim 3, wherein the predetermined aspect is selected from a human physiology-related measurement and/or an operational characteristic of a vessel.

5. The emergency radio beacon of claim 1, being selected from a group consisting of an EPIRB (emergency position-indicating radio beacon), a PLB (personal locator beacon), an ELT (emergency location transmitter), and a SEPIRB (submarine EPIRB).

6. The emergency radio beacon of claim 1, wherein the control means is arranged in communication with the transmitter by means of a suitable electromagnetic waveguide.

7. The emergency radio beacon of claim 1, wherein the control means is configured to encode the spatial positioning data for transmission as part of the emergency signal.

8. The emergency radio beacon of claim 1, wherein the positioning module includes a global navigation satellite system (GNNS) module.

9. The emergency radio beacon of claim 1, wherein the receiver includes a radio frequency receiver configured to receive the activation signal in a frequency allocated for satellite transmission systems.

10. The emergency radio beacon of claim 1, wherein the control means is configured to perform a system diagnostic check on the control means, the receiver, the positioning module and/or an energising means on receipt of an interrogation signal via the receiver.

11. The emergency radio beacon of claim 10, wherein the control means is configured to transmit an outcome of such system diagnostic check.

12. The emergency radio beacon of claim 1, enclosed in a sealed and impact-resistant housing to prevent the ingress of moisture and/or dirt.

13. The emergency radio beacon of claim 1, also including an audible and/or visual indicator that is activated upon receipt of the activation signal.

14. A method for retrofitting an emergency radio beacon with a control means for remote activation of said beacon by a Search and Rescue (SAR) party, said method comprising the steps of:
   providing an emergency radio beacon; and fitting thereto a control means for remote activation of the emergency radio beacon according to claim 1.

* * * * *